United States Patent
Gembler

(10) Patent No.: US 11,330,755 B2
(45) Date of Patent: May 17, 2022

(54) AGRICULTURAL IMPLEMENT

(71) Applicant: AGCO International GmbH, Neuhausen (CH)

(72) Inventor: André Gembler, Feucht (DE)

(73) Assignee: AGCO International GmbH, Neuhausen (CH)

(*) Notice: Subject to any disclaimer, the term of this patent is extended or adjusted under 35 U.S.C. 154(b) by 323 days.

(21) Appl. No.: 16/568,877

(22) Filed: Sep. 12, 2019

(65) Prior Publication Data
US 2020/0077565 A1 Mar. 12, 2020

(30) Foreign Application Priority Data
Sep. 12, 2018 (GB) .................................. 1814800

(51) Int. Cl.
*A01B 73/04* (2006.01)
*A01D 78/10* (2006.01)

(52) U.S. Cl.
CPC ........ *A01B 73/044* (2013.01); *A01D 78/1014* (2013.01)

(58) Field of Classification Search
CPC .......................... A61B 73/044; A01D 78/1014
See application file for complete search history.

(56) References Cited

U.S. PATENT DOCUMENTS

| 4,046,203 A | * | 9/1977 | Ward | A01B 73/044 172/456 |
| 4,316,511 A | * | 2/1982 | Andersen | A01B 73/044 172/456 |
| 4,366,666 A | * | 1/1983 | van der Lely et al. | A01D 78/1014 56/370 |

(Continued)

FOREIGN PATENT DOCUMENTS

| EP | 2661952 A1 | 11/2013 |
| EP | 3284330 A1 | 2/2018 |

(Continued)

OTHER PUBLICATIONS

UK Intellectual Property Office, Search Report for priority application No. 0B1814800.7, dated Mar. 12, 2019.

(Continued)

*Primary Examiner* — Tara Mayo-Pinnock

(57) ABSTRACT

An agricultural implement including a central chassis member having a support structure with support arms connected to the support structure for movement between a working position and a transport position, the support arms having operating elements defining a working width between the operating elements and the main chassis member. The support arms are adjustable in the working position between a length corresponding to minimum working width and a length greater than the minimum working width. In the transport position a distance between the operating elements (Continued)

and the main chassis member is less than the minimum working width. A first stop defines the position of the minimum working width and a second stop arranged vertically with respect to the first stop retains the support arm in the transport position when the distance between the operating elements and the main chassis member is less than the minimum working width.

6 Claims, 10 Drawing Sheets

(56) References Cited

U.S. PATENT DOCUMENTS

| | | | |
|---|---|---|---|
| 4,570,722 A * | 2/1986 | Osborn | A01B 73/044 172/311 |
| 4,723,404 A * | 2/1988 | Aron | A01D 78/1014 56/370 |
| 2003/0041584 A1 * | 3/2003 | Breneur et al. | A01D 78/1014 56/379 |
| 2003/0150626 A1 | 8/2003 | Domries | |
| 2018/0049363 A1 | 2/2018 | Antoni et al. | |

FOREIGN PATENT DOCUMENTS

| | | |
|---|---|---|
| FR | 2 675 979 A1 | 11/1992 |
| GB | 1378645 A | 12/1974 |

OTHER PUBLICATIONS

European Patent Office, Search Report for related European Application No. EP 19 19 6578, dated Feb. 14, 2020.

* cited by examiner

AGRICULTURAL IMPLEMENT

FIELD OF THE INVENTION

The present invention relates to an improved agricultural implement in which operating units extending to each side of a central axis are moved between an operating position and a transport position. The invention has particular application to a haymaking apparatus such as a rake or tedder.

BACKGROUND

It is known to provide haymaking apparatus in which arms extending to each side of a central chassis member are articulated such that the arms can be moved between a generally horizontal working position and a generally vertical transport position. Each of the arms supports one or more operating units, such as rake or tedder rotors. It is desirable to increase the number of such operating implements to produce broader working widths of such tools. However, the height of the apparatus with the arms on the transport position is strictly regulated. It is also an engineering problem that the size, shape and location of the working units and the length of the arms creates an unfavourable centre of gravity that needs to be accounted for when the arms are being moved between the working position and the transport position.

A known solution, EP 2 661 952, involves adjusting the length of the arms and allowing raising of the arms into the transport position only when the arm has been shortened.

It is an advantage of the present invention that it provides an alternative solution to this problem. Other advantages will be apparent from the following text.

SUMMARY OF THE INVENTION

According to a first aspect of the present invention, an agricultural implement comprises a central chassis member having a support structure with support arms connected to the support structure for movement between a working position and a transport position, the support arms being provided with operating elements remote from the support structure defining a working width between the operating elements and the main chassis member, in which the support arms are adjustable in the working position between a length corresponding to minimum working width and a length greater than the minimum working width and in which in the transport position a distance between the operating elements and the main chassis member is less than the minimum working width, characterised in that a first stop defines the position of the minimum working width and a second stop arranged vertically with respect to the first stop retains the support arm in the transport position when the distance between the operating elements and the main chassis member is less than the minimum working width.

Preferably, the second stop is located vertically below the first stop.

Preferably the first stop comprises an arcuate surface. More preferably, the arcuate surface co-operates with the adjacent support arm as the support arm moves toward and away from the working position.

Preferably the second stop prevents rotation of the support arm with respect to the chassis when the support arm is in the transport position.

Preferably the first stop is releasably secured to the support structure. Additionally or alternatively, the second stop is releasably secured to the support structure. This has as an advantage that the stops may be replaced when worn or damaged.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel. Unless the context indicates otherwise, the left and right hand sides of the agricultural implement are symmetrical about the centre axis.

Figure 1:
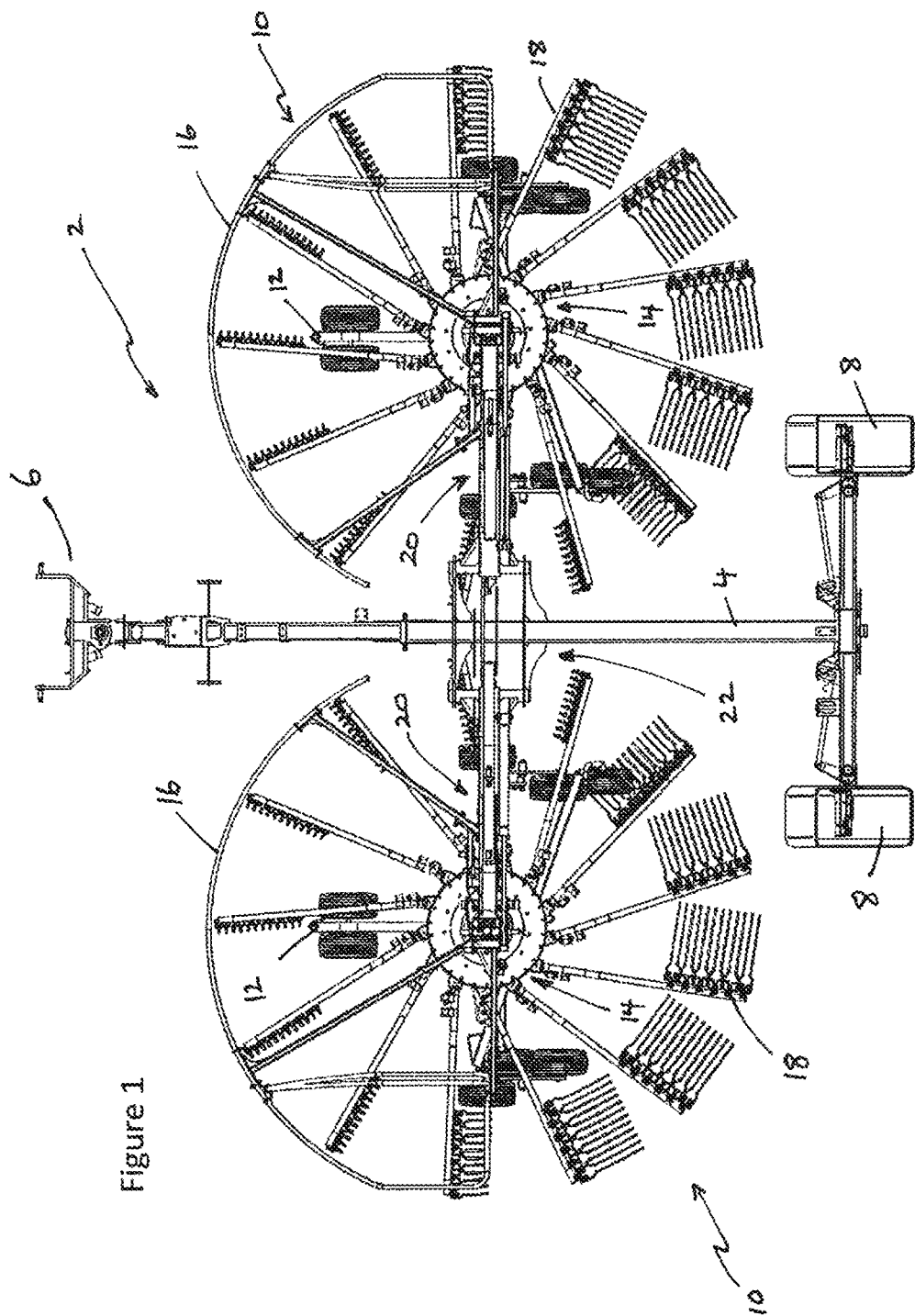
FIG. 1 shows a plan view of a rake in accordance with the present invention in which the support arms are each in a working position.

With reference to FIG. 1, there is shown a towed agricultural implement 2 comprising a central main chassis member 4 and first and second operating units 10 disposed to either side of the central main chassis member 4. The central main chassis member 4 is provided at a front end with suitable connection means 6, for example a three point hitch, for connecting the towed agricultural implement 2 to an agricultural vehicle such as a tractor and at a rear end with a set of steerable wheels 8.

Each of the operating units 10 can be seen to comprise a wheel support structure 12 supporting a rake rotor 14 and an associated front guard rail 16. The rake rotor 14 typically comprises a plurality of tine carrying tine arms 18, each of the tine arms 18 being held in a central hub arrangement adapted to adjust the radial alignment of each tine arm 18 about its longitudinal axis as the hub rotates.

Each operating unit 10 is connected to the main chassis member 4 by a support arm 20, described in greater detail by reference to FIGS. 2 to 10.

A support structure 22 is connected to the main chassis member 4 by any suitable means, for example by welding. The support structure 22 comprises two sets of elements: a first set of support plates 24, 25 defining outer longitudinal boundaries of the support structure 22 and a pair of mounting plates 26, 27 disposed between the support plates 24, 25.

Each of the support plates 24, 25 are generally triangular with lower points extending to either side. Each support plate 24, 25 includes a central opening 28 of shape and size corresponding to an outer cross section of the main chassis member 4 by which the support plates 24, 25 are mounted on the main chassis member 4. The lower points of the support plates 24, 25 are further provided with circular openings 30.

Each support plate 24, 25 is in contact with an edge of an outer side element 32. The outer side element 32 is generally planar with tubular mounting points 34 at each end provided in alignment with the circular openings 30 in the support plates 24, 25. A central portion of the outer side element 32 is conveniently provided with an opening 36 by which the side element can be secured to an underside of the main chassis member 4. The tubular mounting points 34 and the circular openings 30 together support a first end of a generally cylindrical tubular member 38.

Figure 1A:
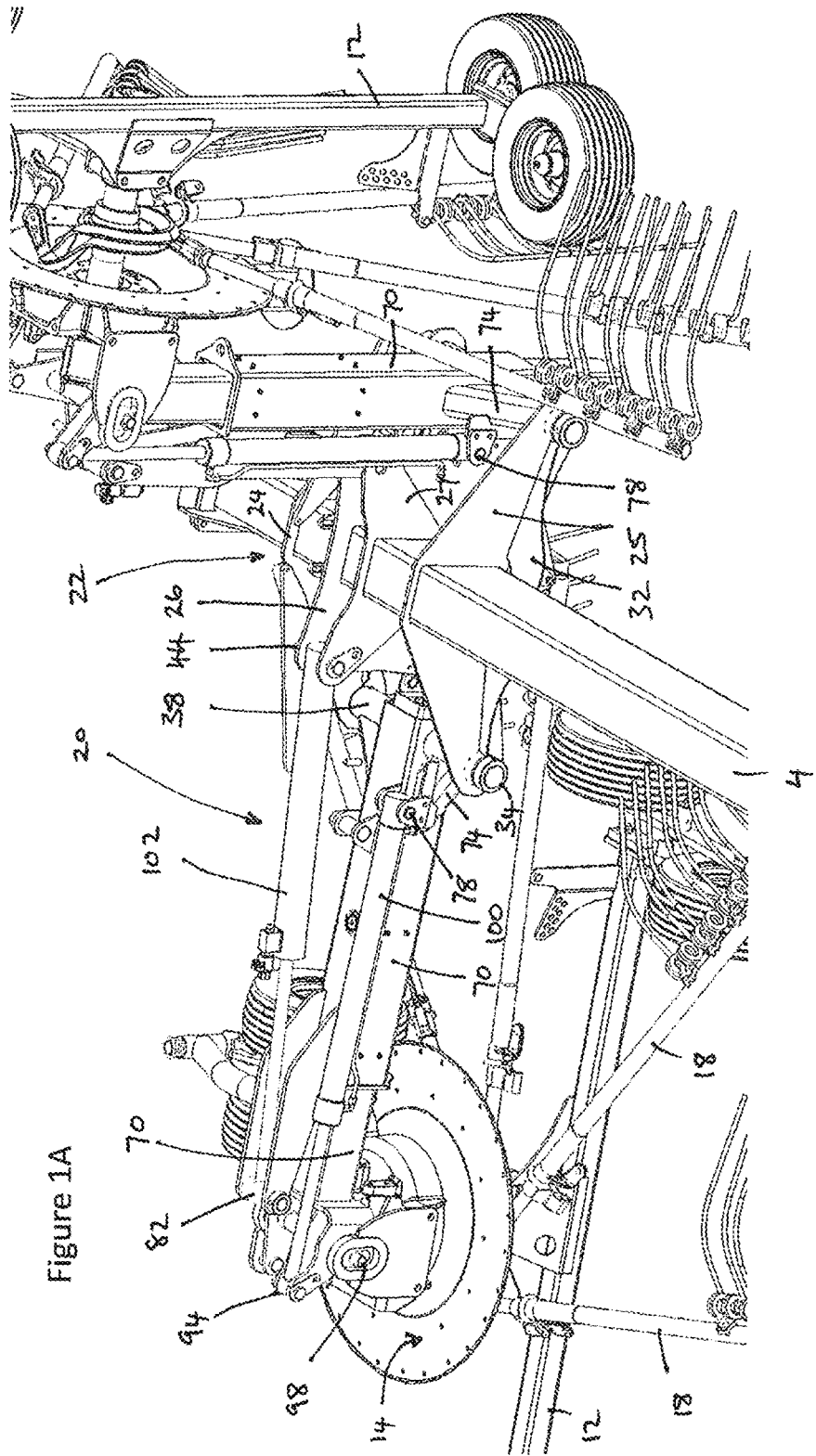
FIG. 1A shows a perspective view of the rake of FIG. 1 in which the left support arm is in the working position and the right support arm is in a transport position.
Figure 2:
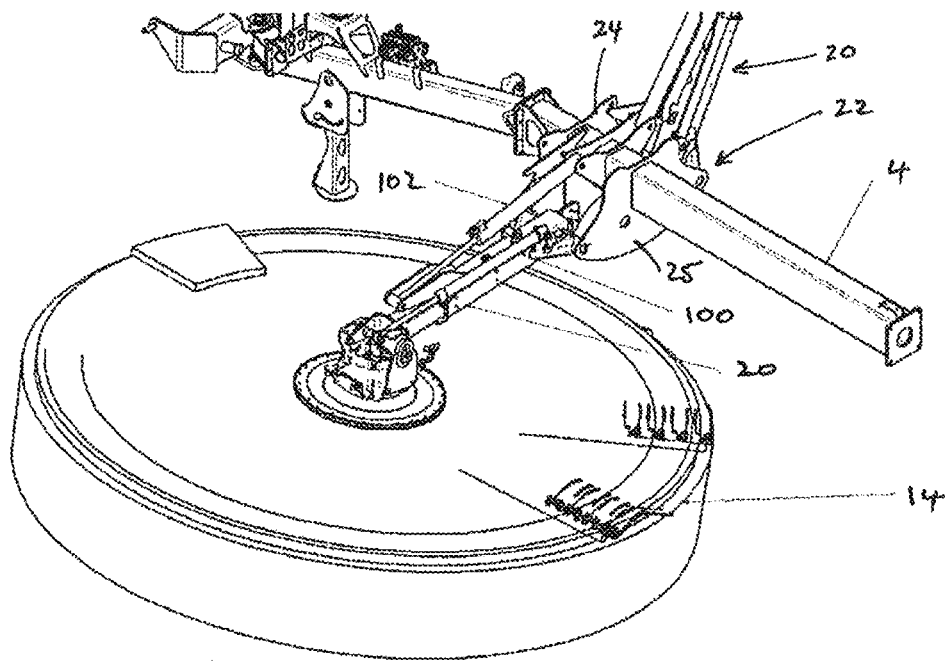
FIG. 2 shows a perspective view of the rake of FIGS. 1 and 1A in which the left support arm is in the working position and the right support arm is raised towards the transport position.
Figure 3:
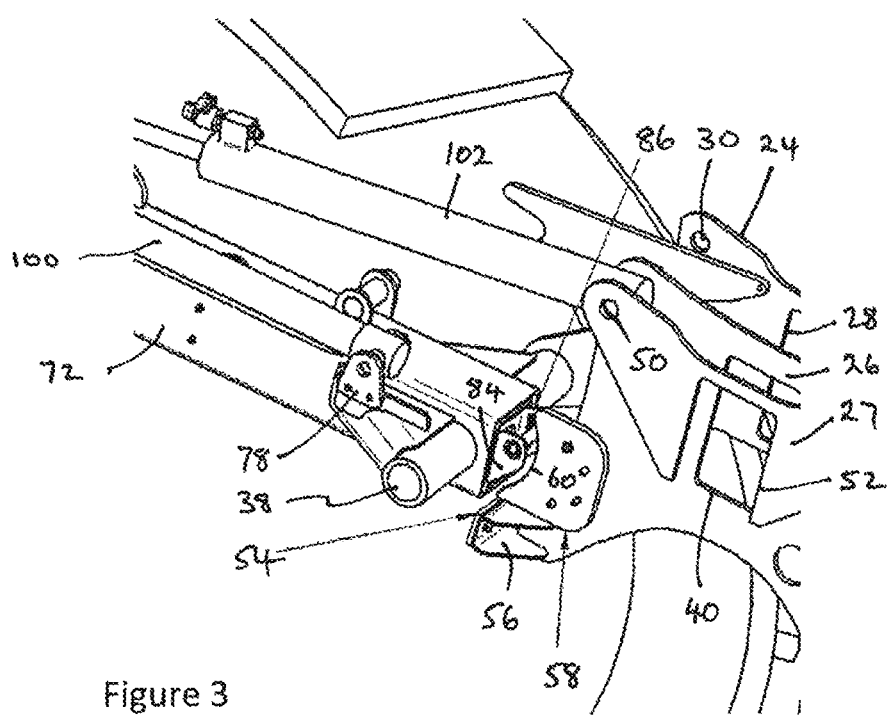
FIG. 3 shows a detail of FIG. 2 in which certain elements have been removed for clarity.
Figure 4A:
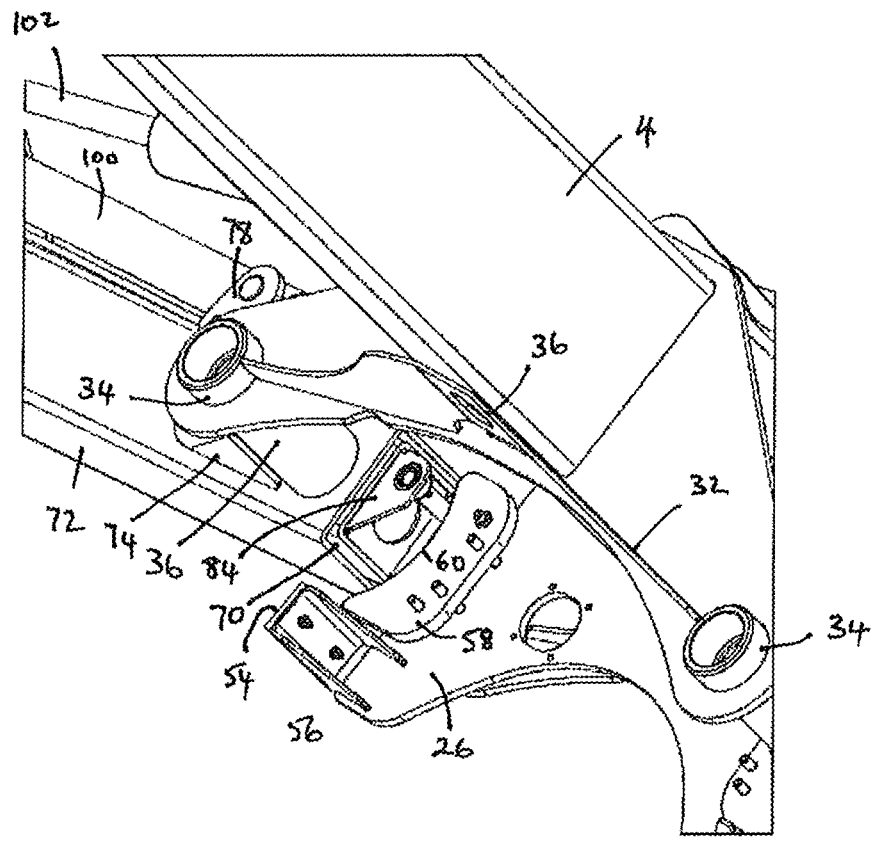
FIGS. 4A and 4B show alternative views of the detail of FIG. 3 in which certain elements have been removed for clarity.
Figure 4B:
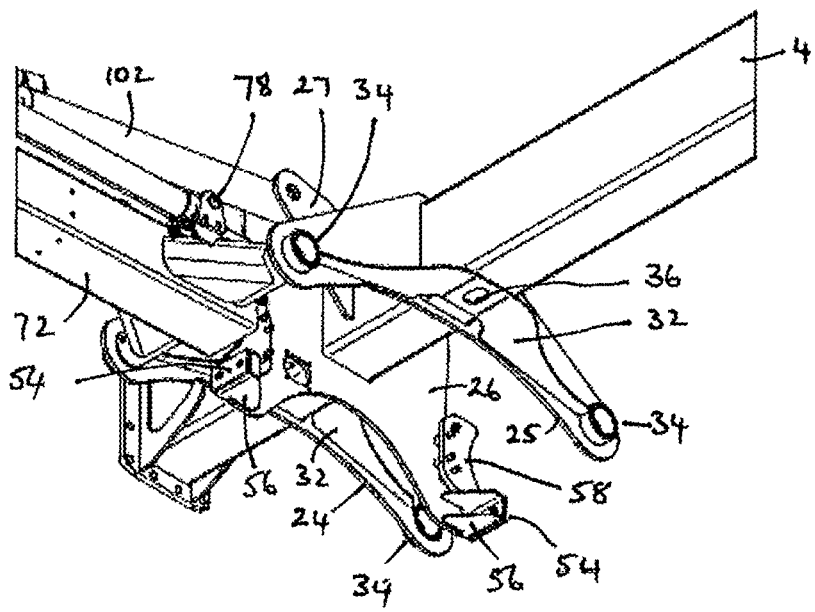

A first one of the pair of mounting plates 26 is generally rectangular and includes a central opening 40 of shape and size corresponding to the outer cross section of the main chassis member 4 by which the first mounting plate 26 is mounted and secured, for example by welding, onto the main chassis member 4. Upper corners of the first mounting plate 26 are provided with openings 42 to serve as attachment points for a first pivot pin 44 (cf FIG. 1A) Lower corners of the first mounting plate 26 are provided with downwardly, outwardly extending legs 46 terminating in outwardly extending feet 48.

A second one of the pair of mounting plates 27 takes the general form of an inverted triangle, the upper two corners being provided with openings 50 to serve as attachment points for the first pivot pin 44. The apex of the triangle is provided with a cut away portion 52 of suitable size and shape corresponding to part of the outer cross section of the main chassis member 4 by which the second mounting plate 27 can be secured to the main chassis member 4 such that the upper corner openings 42, 50 of each of the first and second mounting plates 26, 27 are aligned.

The first mounting plate 26 is further provided at each lower side region with a longitudinally extending plate 54 and a guide member 58.

Each longitudinally extending plate 54 is mounted to one of the feet 48 of the first mounting plate 26. The longitudinally extending plate 54 is conveniently held substantially vertically at a distance from the first mounting plate 26 by a bracket 56 connected and secured, for example by welding, between the foot 48 of the first mounting plate 26 and the longitudinally extending plate 54. Preferably the bracket 56 and the longitudinally extending plate 54 extend longitudinally to one side of the first mounting plate 26. More preferably, the bracket 56 and the longitudinally extending plate 54 extend towards an adjacent support plate (for example as best shown in FIGS. 4A, 4B, 6A and 8A). Alternatively, the bracket 56 and the longitudinally extending plate 54 extend longitudinally to each side of the first mounting plate 26. The longitudinally extending plate 54 may be formed of any suitable material, preferably a durable plastics material.

The longitudinal plate 54 may be secured to the bracket 56 in any suitable manner. The bracket 56 may be secured to the mounting plate 26 in any suitable manner.

The guide member 58 is located on a lower part of the first mounting plate 26 above the foot 48. The guide member 58 may be formed integrally with the mounting plate 26 or as in the illustrated embodiment be secured to the mounting plate 26. The guide member 58 is preferably releasably secured, by any suitable means, in order that it may be replaced when worn. The guide member 58 is provided along a vertical laterally outer edge with an arcuate surface 60.

As can be seen from, for example FIGS. 3, 4A, 4B, 5, 6A, 7, 8A, 9 and 10, the longitudinally extending plate 54 and the guide member 58 are vertically aligned with one another, the arcuate surface 60 being above the longitudinal plate 54 and its associated bracket 56.

Each support arm 20 comprises an inner part 70 and an outer part 72. Each of the inner and outer support arm parts 70, 72 is formed as a hollow member. The inner support arm part 70 is nested for movement within the outer support arm part 72 as described below.

Figure 5:
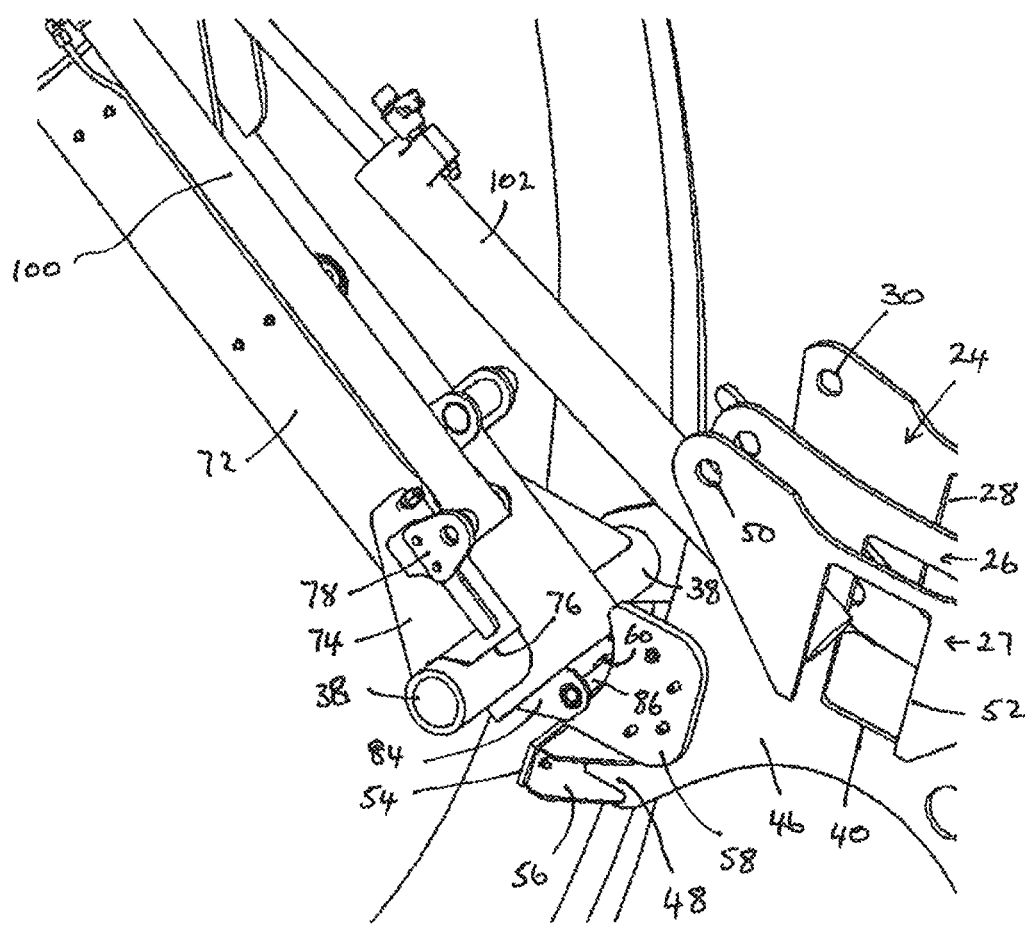
FIG. 5 shows a view similar to that of FIG. 3 in which the left support arm has moved from the working position toward the transport position.

The outer support arm part 72 is provided at an inner end with a generally triangular bracket 74 to each side. A base of the bracket 74 is provided with an arcuate surface 76 suitable for seating on the corresponding generally cylindrical tubular member 38. A mounting point for a second end of the cylindrical tubular member 38 is provided on the outer support arm part 72 below the triangular bracket (as seen in the transport position of FIGS. 8A, 8B and 9). In use, this allows for pivoting movement of the outer support arm part 72 with respect to the support structure 22 about the cylindrical tubular member 38. A second mounting means 78 is secured to the inner end of the outer support arm part 72. Conveniently the second mounting means 78 takes the form of a bracket extending upwards from one of the side triangular brackets 74 (FIG. 5).

The outer support arm part 72 is further provided on an upper surface at an outer end (in the working position of the support arm of FIGS. 2, 3, 4A and 4B) with an outer support bracket 80 extending outwardly beyond the outer end of the outer support arm part 72. The free end of the outer support bracket 80 is provided with a suitable mounting point for a second pivot pin 82.

An inner end of the inner support arm part 70 is provided with an inner mounting bracket 84 in which a rotatable bolt 86 is mounted. Conveniently the inner mounting bracket 84 is provided with suitable bearings, such as plastics bearings, in which the bolt 86 may rotate. The outer end of the inner support arm part 70 is provided with third and fourth mounting brackets 92, 96. The free ends of the third mounting bracket 92 are provided with a suitable mounting point for a third pivot pin 94. The free ends of the fourth mounting bracket 96 are provided with a suitable mounting point for a fourth pivot pin 98 by which a mounting point of the operating unit 10 may be supported on the support arm 20.

A first hydraulic cylinder 100 is connected at a first inner end to the second mounting bracket 78 of the outer support arm part 72 and at a second outer end to the third mounting bracket 92 of the inner support arm part 70.

A second hydraulic cylinder 102 is connected at a first inner end to the first pivot pin 44 extending between the mounting plates 26, and at a second outer end to the outer support bracket 80 at the outer end of the outer support arm part 72.

If, in the working position, it is desired to lengthen the support arm 20 the first hydraulic cylinder 100 may be extended. However, the support arm 20 may not be reduced beyond the positions shown in FIGS. 1 and 2 since the rotatable bolt 86 is in contact with the arcuate surface 60 of the guide member 58 and accordingly the guide member 58 functions as a stop to prevent such movement.

Figure 6A:
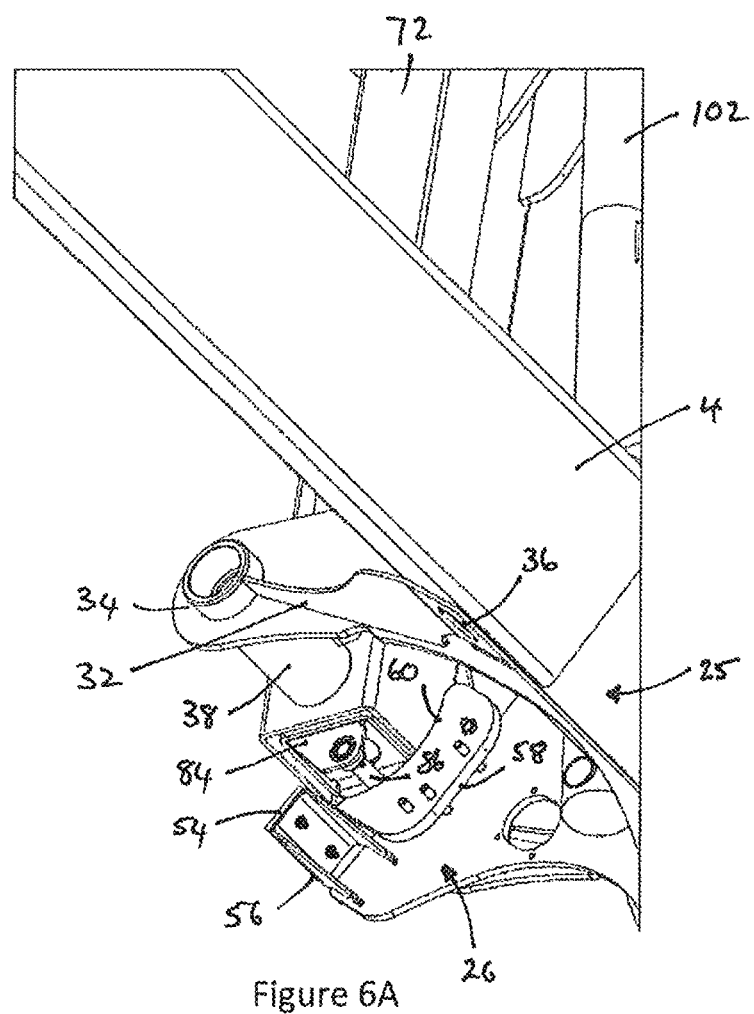
FIGS. 6A and 6B show alternative views of the detail of FIG. 5 in which certain elements have been removed for clarity.
Figure 6B:
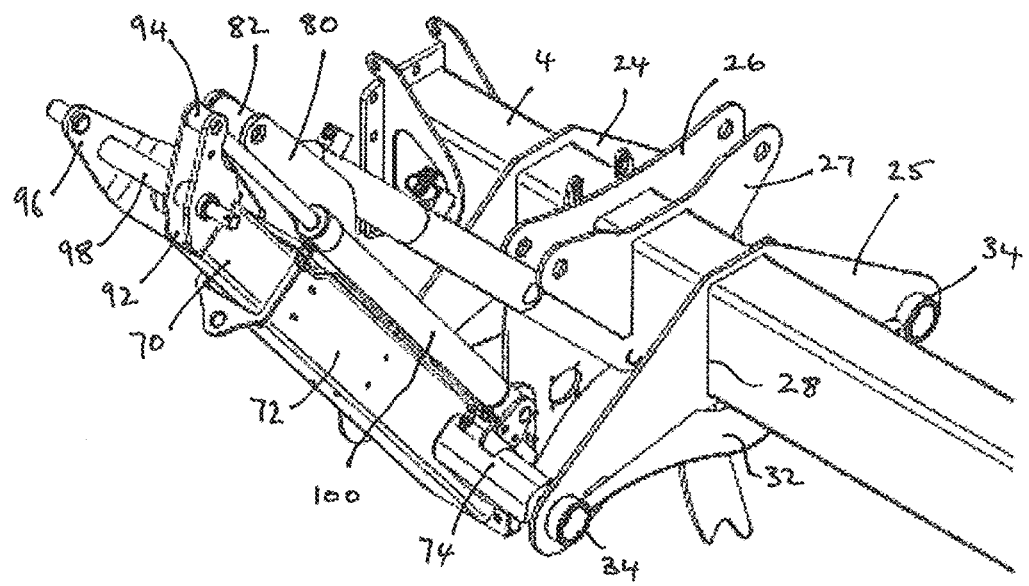

In order to further reduce the length of the support arm 20, the support arm 20 must first be raised. This is achieved by actuation of the second hydraulic cylinder 102 to shorten its length. This causes the inner and outer support arm parts 70, 72 to pivot about the tubular members 38 located to each side of the inner end of the outer support arm part 72. As can be seen in FIGS. 5 and 6, this also causes the rotatable bolt 86 to travel along the curved outer surface 60 of the guide member 58.

It will be understood that the support arms may be partially raised to a headland position and the minimum working width is maintained.

Continued pivoting will result in the outer support arm part 72 adopting a substantially vertical position such that the inner end of the inner support arm part 72 is now clear of the arcuate surface 60 of the guide member 58.

Figure 7:
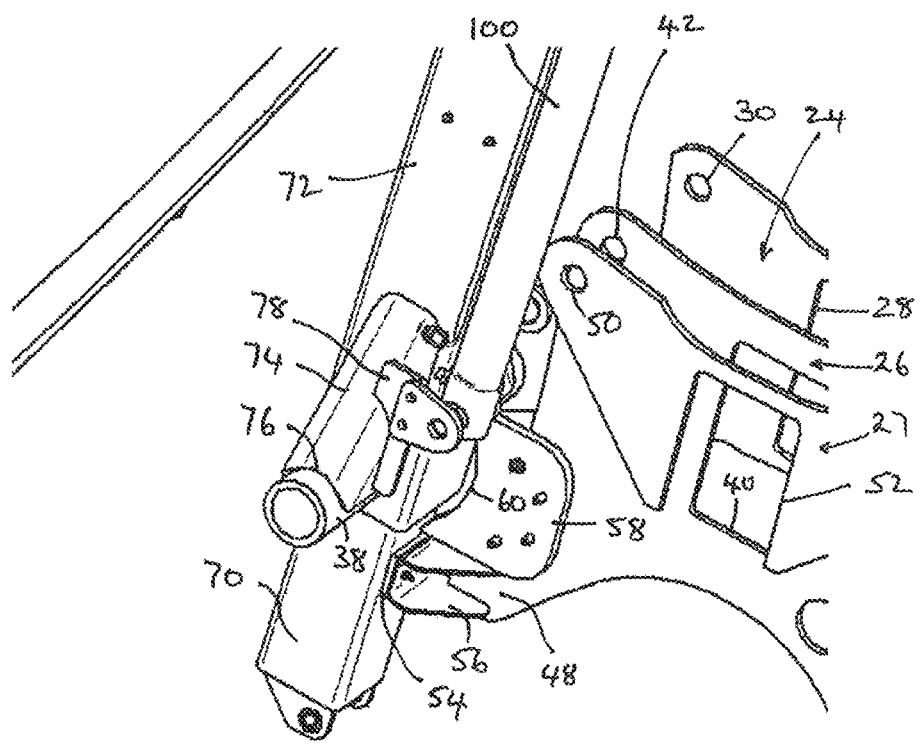
FIG. 7 shows a view similar to that of FIG. 3 in which the left support arm has reached the transport position.

The first hydraulic cylinder 100 may now be actuated to reduce its length in order to move the inner support arm part 70 within the outer support arm part 72. The inner end of the inner support arm part 70 is free to move downward past the guide member 58 and past the vertical longitudinally extending plate 54 (FIGS. 7 and 8). It will be seen that in this position, the transport position, the vertical longitudinally extending plate 54 serves as a stop to prevent the support arm 20 from being rotated away from the transport position. This stop may be adjustable for clearance free operation.

By limiting the movement of the hydraulic cylinder 100, further downward movement is prevented.

Figure 8A:
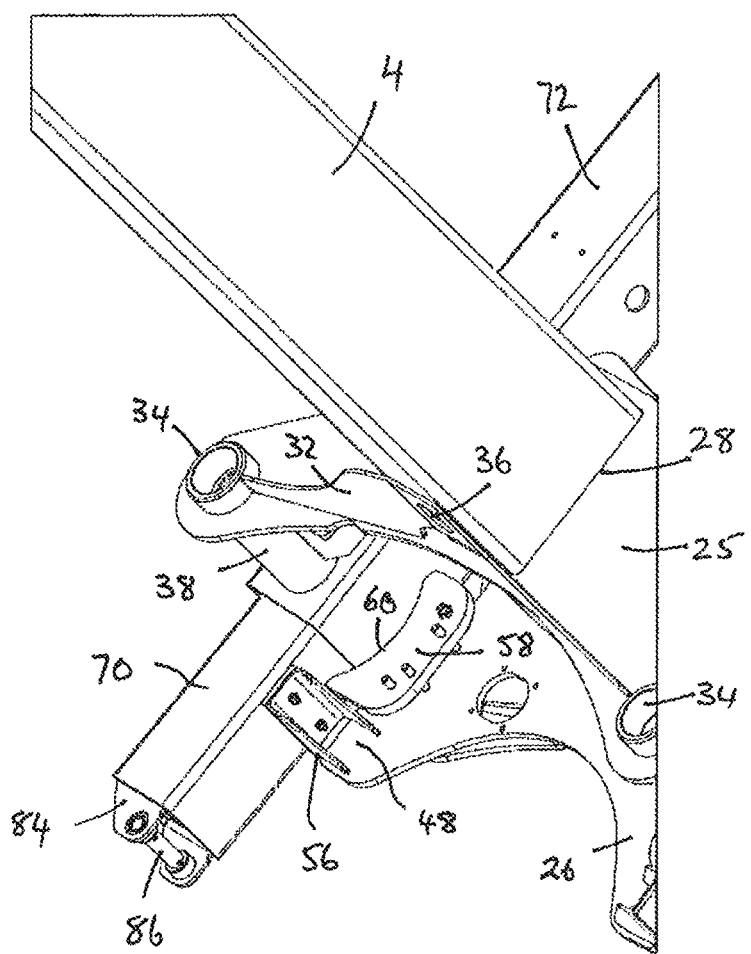
FIGS. 8A and 8B show alternative views of the detail of FIG. 7 in which certain elements have been removed for clarity.
Figure 8B:
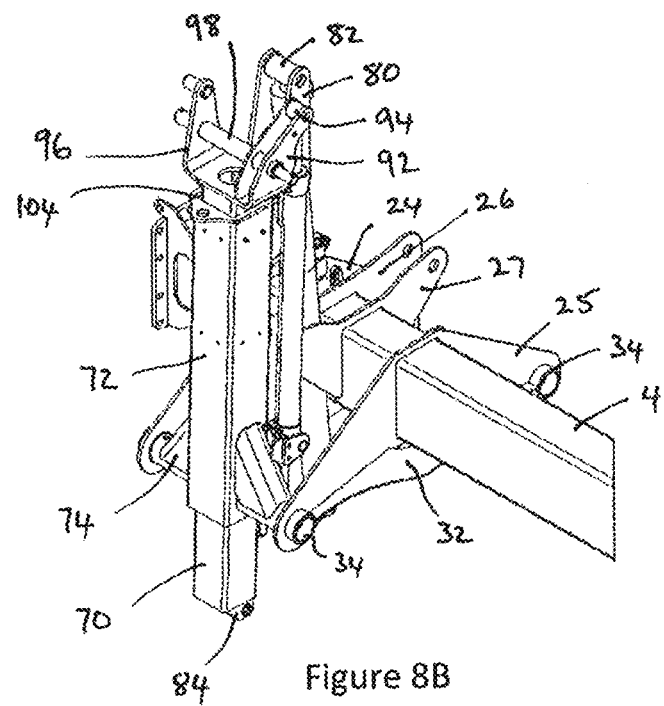
Figure 9:
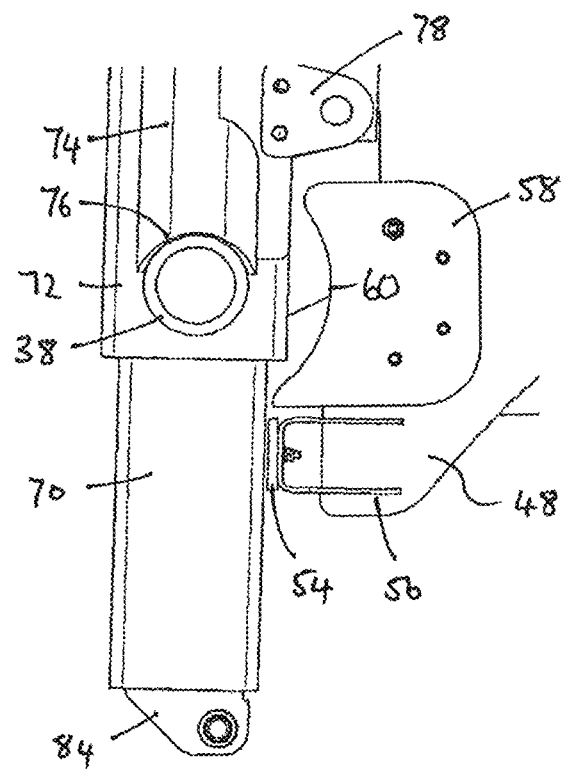
FIG. 9 shows an end view of the detail of FIG. 7.
Figure 10:
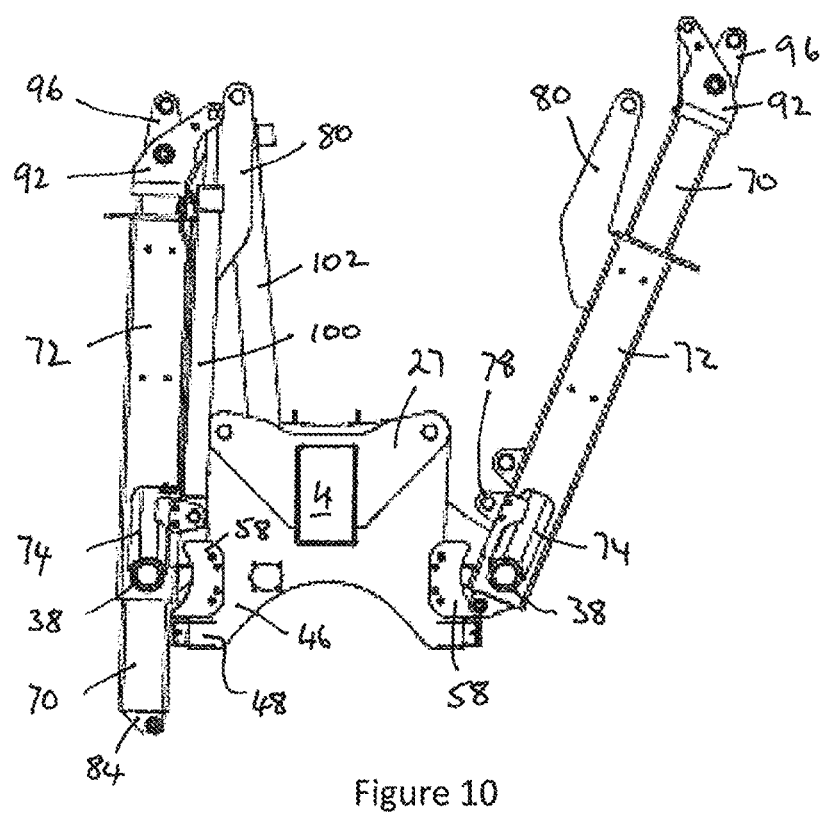
FIG. 10 shows an end view of the chassis in which the left support arm is in the transport position and the right support arm is between the working position and the transport position.

However, as can be seen, for example from FIG. 8B, the third and fourth mounting brackets 92, 96 at the outer end of the inner support arm part 70 and a peripheral flange 104 provided about the outer end of the outer support arm part 72 may also co-operate to prevent further downward movement of the inner support arm part 70.

In order to return the support arm 20 to the working position, the second hydraulic cylinder 100 must be actuated to extend it length and so draw the inner support arm part 70 upward within the outer support arm part 72 until the rotatable bolt 86 can clear a lower edge of the arcuate surface 60 of the guide member 58. The first hydraulic cylinder 102 can then be actuated to rotate the support arm 20 into the working position.

The present invention has as an advantage that control of the raising and lowering of the support arm 20 is achieved solely through the use of the hydraulic cylinders 100, 102. It is not necessary to control movement of additional parts to achieve this functionality.

From reading the present disclosure, other modifications will be apparent to persons skilled in the art. Such modifications may involve other features which are already known in the field of rakes and tedders and component parts therefore and which may be used instead of or in addition to features already described herein.

The invention claimed is:

1. An agricultural implement comprising:
a main chassis member having a support structure with support arms connected to the support structure for movement between a working position and a transport position, the support arms having operating elements remote from the support structure defining a working width between the operating elements and the main chassis member, in which the support arms are adjustable in the working position between a length corresponding to a minimum working width and a length greater than the minimum working width and in which in the transport position, a distance between the operating elements and the main chassis member is less than the minimum working width, wherein a first stop defines the position of the minimum working width and a second stop, arranged vertically below with respect to the first stop, retains the support arm in the transport position when the distance between the operating elements and the main chassis member is less than the minimum working width.

2. The agricultural implement according to claim 1, wherein the first stop comprises an arcuate surface.

3. The agricultural implement according to claim 2, wherein the arcuate surface co-operates with the adjacent support arm as the support arm moves toward and away from the working position.

4. The agricultural implement according to claim 1, wherein the second stop prevents rotation of the support arm with respect to the chassis when the support arm is in the transport position.

5. The agricultural implement according to claim 1, wherein the first stop is releasably secured to the support structure.

6. The agricultural implement according to claim 1, wherein the second stop is releasably secured to the support structure.

* * * * *